(No Model.) 2 Sheets—Sheet 1.
G. & J. LEBAUDY.
APPARATUS FOR THE MANUFACTURE OF LUMP SUGAR.
No. 259,874. Patented June 20, 1882.
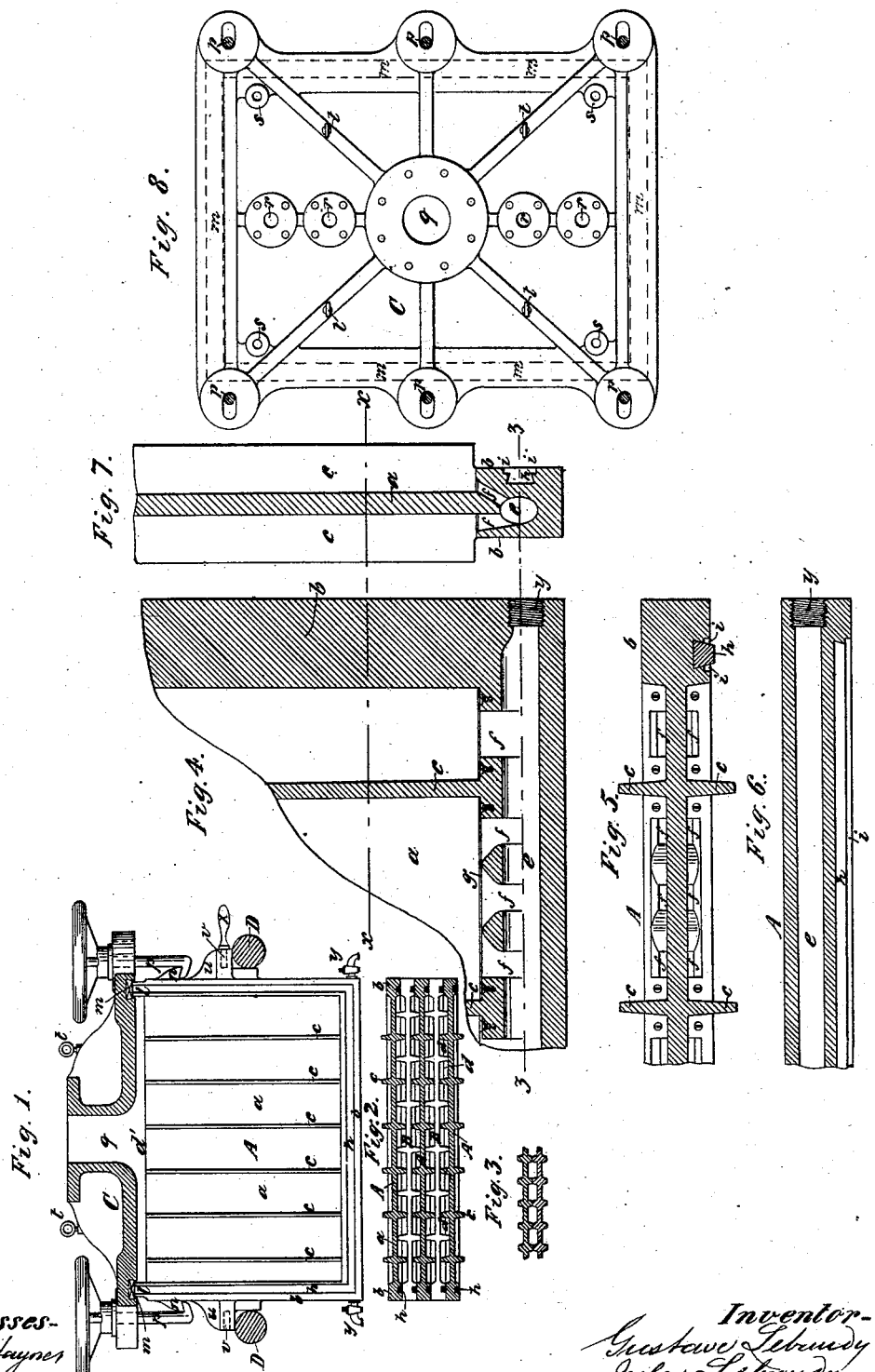

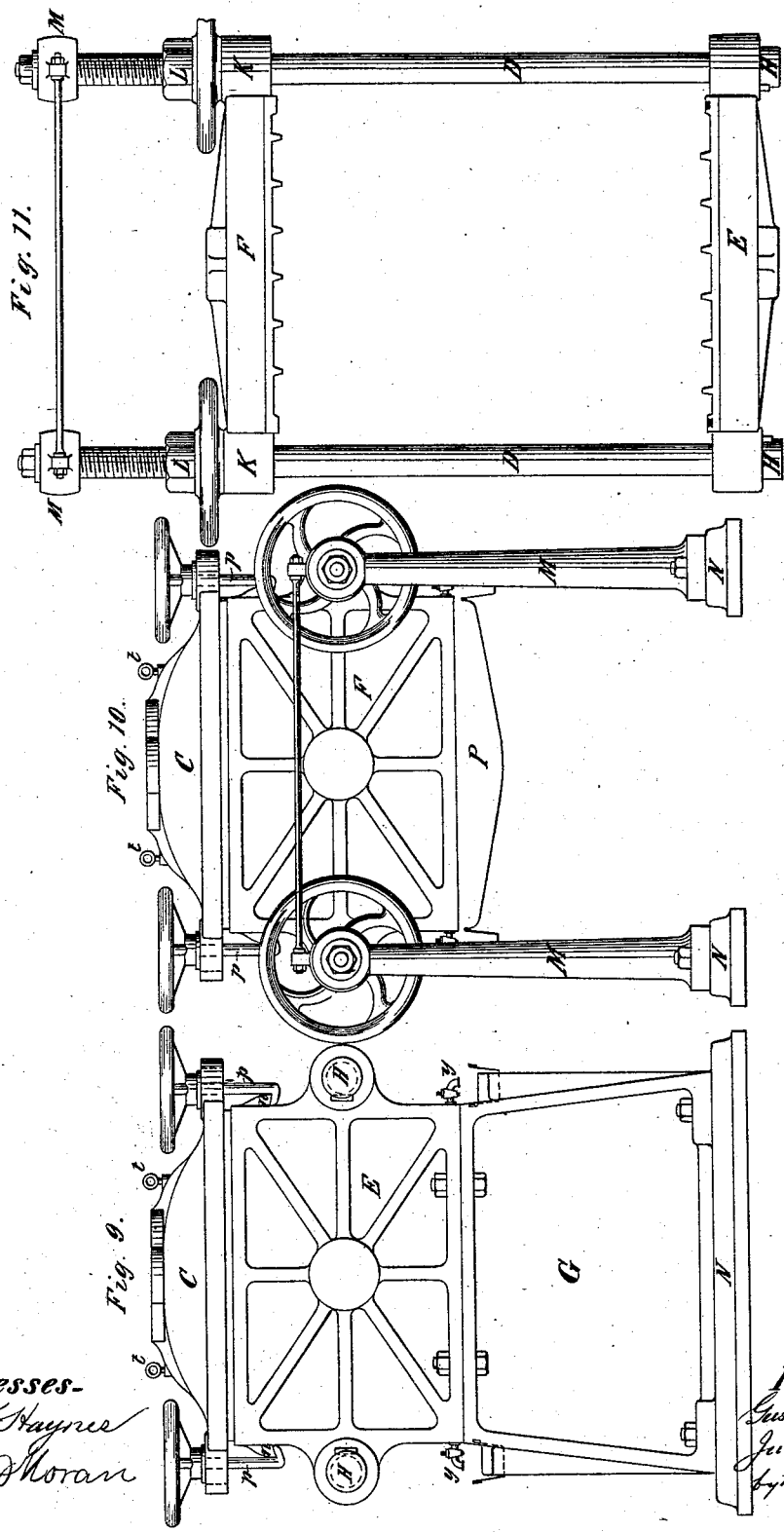

UNITED STATES PATENT OFFICE.

GUSTAVE LEBAUDY AND JULES LEBAUDY, OF PARIS, FRANCE.

APPARATUS FOR THE MANUFACTURE OF LUMP-SUGAR.

SPECIFICATION forming part of Letters Patent No. 259,874, dated June 20, 1882.

Application filed April 4, 1882. (No model.) Patented in France December 16, 1881.

*To all whom it may concern:*

Be it known that we, GUSTAVE LEBAUDY and JULES LEBAUDY, of Paris, in the Republic of France, have invented certain new and useful Improvements in Apparatus for the Manufacture of Lump-Sugar, of which the following is a specification, reference being had to the accompanying drawings.

This invention has for its object the production of refined sugar in lumps of the size desired for consumption, with a crystallization similar to that of sugar refined in loaves.

The apparatus which we employ consists of plates which are in contact with each other at their edges, and which are hollowed out in such manner as to mold between them blocks, sticks, or ingots of sugar of the form desired, either cubical, rectangular, parallelopipedal, or of any other form. We give by preference to each cavity formed between the plates the transverse dimensions of what is called the "ingot" in the language of the industry of sawing and breaking up loaves of sugar, so that the molded sugar taken from our apparatus has the form of a rectangular prism, of which the two smaller dimensions are equal to the larger dimensions of the lumps of sugar to be produced for consumption. We thus avoid the use of saws and consequent waste in the form of powder. To obtain the lumps it suffices to pass these ingots through the ordinary breaking-machine, and as they have a rectangular prismatic form they do not produce any lumps with curved or beveled faces.

The cavities are formed by the juxtaposition of the plates, and in such manner that parts of the walls of one cavity may belong to one plate and other parts to the adjacent plate, so that to free the pieces from the molds it is only necessary to separate the two plates.

The boiled sugar may be forced into the apparatus under a pressure or be allowed to run into it without pressure. It may be allowed to agglomerate at once by slow cooling; or it may be purged of its green sirup. The purging it of the green sirup may be effected either naturally or by aspiration or suction, either by pressure of air or vapor, or by a mixture of the two. It may or may not be decolored by passing through it a white sirup. It should be afterward dried by forcing or drawing through it compressed air, which may be preparatorily dried and heated. Other decoloring agents may be used, as alcohol, steam, or water. A current of cold air may be passed through the mass after the hot air, for the purpose of contracting the sugar and thereby facilitating its removal from the molds.

The invention consists in a novel construction of the plates, hereinafter described and claimed, whereby facility is afforded for purging, decoloring, and drying the sugar, and for the removal of the lumps, sticks, or ingots from the cavities therein.

In the accompanying drawings, Figure 1 is an elevation partly in section of the system of plates and the cover applied to them. Fig. 2 is a horizontal section of several of the plates in juxtaposition. Fig. 3 is a horizontal sectional view, illustrating a modification of the plates. Fig. 4 is a vertical section of a part of one of the plates, parallel with the face thereof. Fig. 5 is a horizontal section taken in the line *x x* of Figs. 4 and 7. Fig. 6 is a horizontal section in the line *z z* of Figs. 4 and 7. Fig. 7 is a transverse vertical section corresponding with Fig. 4. Fig. 8 is a plan of the cover for the plate. Fig. 9 is a back view of a complete apparatus. Fig. 10 is a front view of the same. Fig. 11 is a plan of the framing of the apparatus.

Similar letters of reference indicate corresponding parts in the several figures.

As may be seen in the drawings, the apparatus is composed of plates placed in a frame similar to that of a filter-press. The plates A B, represented as arranged vertically, are of brass or other metal or material. Each of them is formed of a median plate or web, *a*, having on three sides and on both faces projecting rims *b*, which form joints with the adjacent plates, and having on their faces ribs *c c*, which constitute the walls of the cavities *d* in said plates, in which are formed ingots of sugar. These ribs alternate on each plate and its next neighbor, as shown in Fig. 2, so that on the separation of the plates the ingots may be more easily liberated from the cavities *d*, and their sides are slightly tapered to further facilitate the drawing or delivery of the molded ingots without breaking them.

A channel, *e*, formed in the base of each plate, as shown in Figs. 4, 6, and 7, communicates with the bottom of said cavities *d d* by passages *f f*. (Shown in Figs. 4 and 5.) These passages are covered with strainers, of wire-gauze or finely-perforated metal, *g*, as shown in Fig. 4, the passages being arranged so as to give the largest surface to the strainers, and so that the ingot in each cavity *c* may drain or purge into two channels, *e*, as may be understood by reference to Figs. 5 and 7.

At each extremity of each channel *e* is a lapped opening, at *y*, for the reception of a cock which serves to regulate the speed at which the clarifying agents pass through the sugar.

To insure the tightness of the joints between the plates A B, and yet not prevent the close contact of the ribs *c c* upon the contiguous plates, a dovetail groove, *h*, with the lateral rabbets or cavities *i i*, is formed on one of the faces of the rim *b* of each, and this groove holds a rubber strip of trapeziform section, which, when not pressed, projects beyond the face of the plate. The plates being brought together by a strong pressure, the india-rubber band spreads into the rabbets *i i*, and so allows the metal faces of the ribs *c c* and rims *b b* to come close together.

The bodies of the plates A A and the joints, hereinabove described, are prolonged, as shown at *l* in Fig. 1, above the median web *a*, in such manner as to form, with a cover, C, a cavity, *d'*, (see Fig. 1,) to contain sugar enough to connect all the heads of the ingots in the several cavities *d* of the apparatus. The cover C contains, as shown in Fig. 1, in a dovetail groove, *m*, a strip of india-rubber, which makes joint with all the projections *l*. To tighten this joint we take advantage of the solid ensemble which is formed by the several plates A B, one with another, and upon which the joint is made. The plates have also lateral projections *n n*, as shown in Figs. 1 and 9, with which engage the hook-bolts *p p*, which are attached to the the cover C, and which serve to screw down the latter tightly.

The cover is provided with openings *q r r r r*, which are flanged for the connection of the pipes, those *q* serving for the entrance of the sugar and those *r r r r* for the admission of clarifying, purging, and drying agents.

Air-cocks for the escape of air may be provided at *s s*, (see Fig. 8,) and the cover is provided with rings *t t*, by which to lift it when necessary.

The plates A B are connected by a contrivance like what is used on the plates of filter-presses. Each plate is furnished with two ears, *u*, (see Fig. 1,) by which it is supported on two cylindrical bars, D, between which it settles itself. In holes *v*, bored in these ears, are introduced removable handles *x*, to separate the plates successively from each other for removal of the molded sugar.

The two extreme or outermost plates, E and F, are furnished internally only with the ribs *c c*, like the plates A B, but are furnished externally with strengthening-ribs. The back plate, E, is bolted to the framing G and receives the keyed heads H of the bars D. The front plate, F, is furnished with ears K, which fit the bars D, so as that the plates may slide on the said bars. The bars D are screw-threaded upon a portion of their length and fitted with nuts L, which serve to press the several plates closely together and insure the tightness of the joints between them. The forward ends of the bars D are supported by two braced columns, M M, bolted to the bed-plate N.

The plates A B may be made in several pieces to facilitate the removal of the molded sugar. In such case the ribs or blades *c* might be independent of the web *a*.

The ribs attached to the plates might be reduced one-half in their projection and placed face to face, as shown in Fig. 3.

The projecting rims *b* on the faces of the plates might be complete on the four sides, and in such case the cover C might be dispensed with and the feeding effected by a channel placed in the center, in one of the corners, or near the center of the plates.

The median web *a* might be hollow to provide for cooling the molded sugar rapidly by a circulation of cold water or air.

The plates might be placed horizontally instead of vertically.

What we claim as our invention, and desire to secure by Letters Patent, is—

1. The combination of adjacent plates A B, having projections *c c*, arranged so that those of said projections on one plate alternate between those on the next plate, substantially as and for the purpose herein described.

2. The plates A B, constructed with ribs *c*, projecting rims *b*, channel *e*, passages *f*, and provided with strainers *g*, all substantially as and for the purpose herein described.

3. The combination of the plates A B, having the prolongations *l l*, and the cover C, furnished with packing *m* to form joints with the said prolongations, the said cover and prolongations forming a cavity, *d*, substantially as and for the purpose herein shown and described.

This specification signed this 27th day of February, 1881.

GUSTAVE LEBAUDY.
JULES LEBAUDY.

In presence of—
EUG. DUBERIL,
A. SCHWAB.